Patented Jan. 31, 1928.

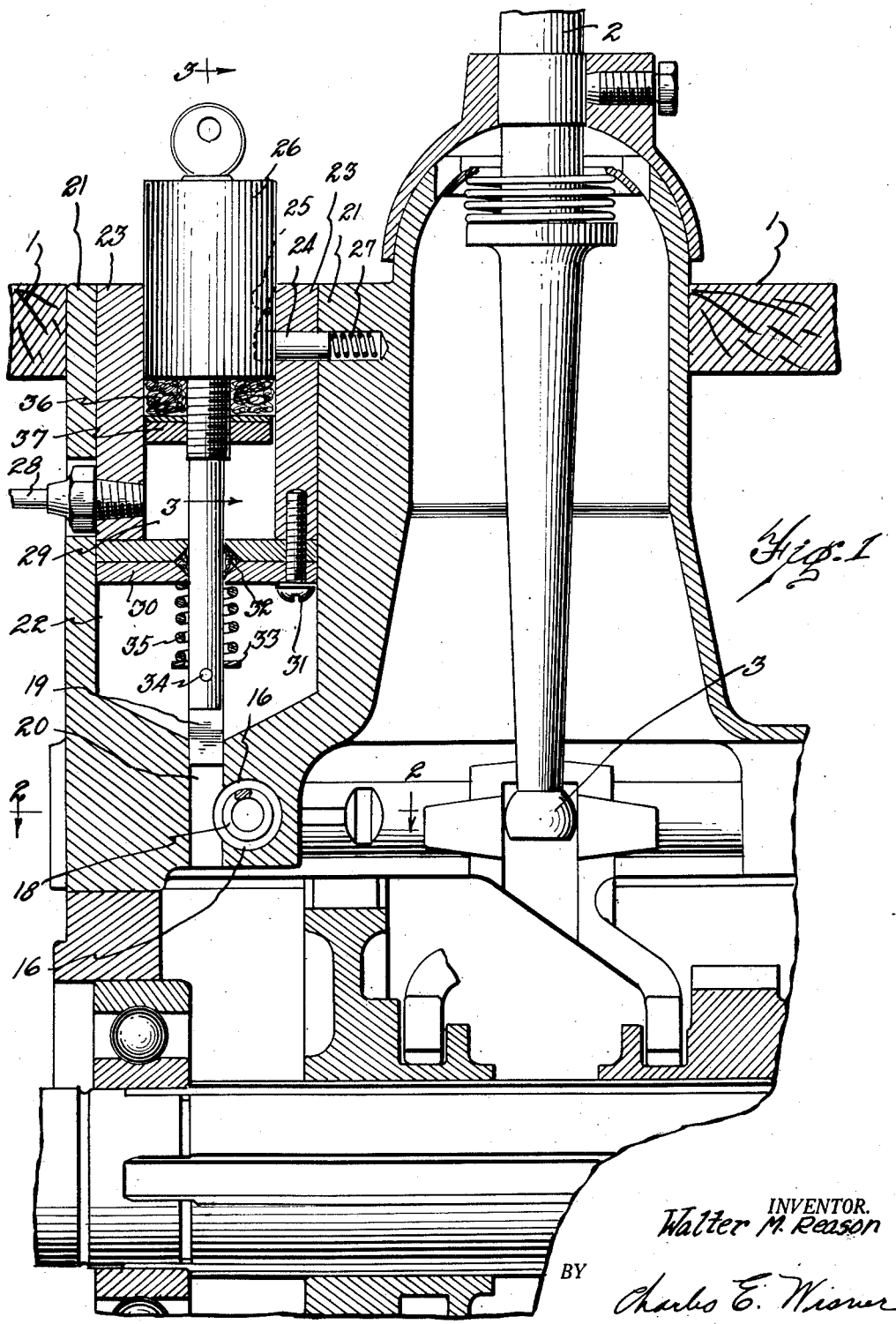

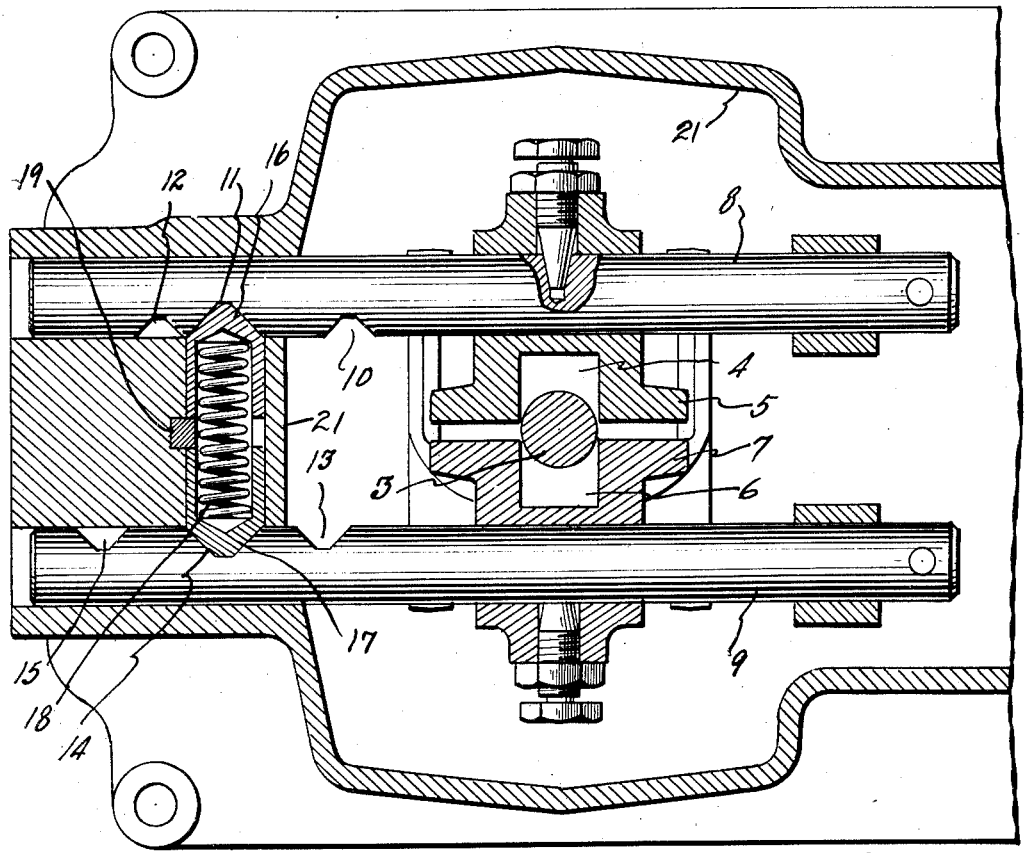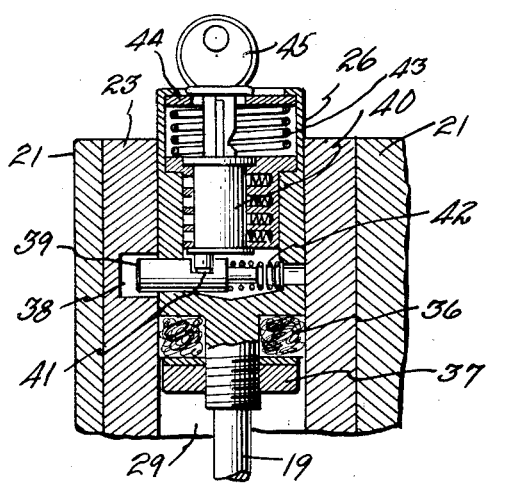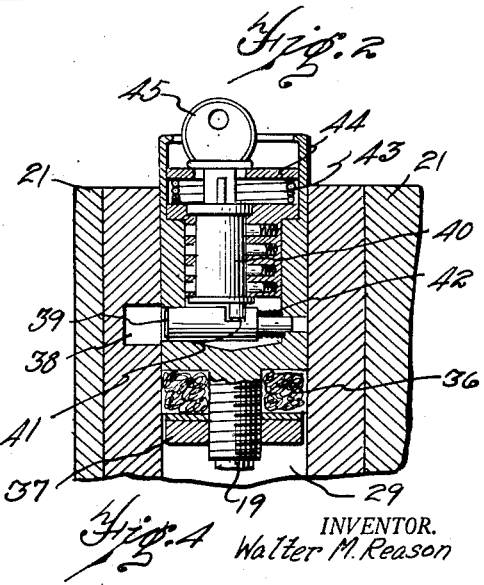

1,657,517

UNITED STATES PATENT OFFICE.

WALTER M. REASON, OF PONTIAC, MICHIGAN, ASSIGNOR TO ELIZABETH BALLAMOS, OF PONTIAC, MICHIGAN.

TRANSMISSION LOCK.

Application filed November 20, 1924. Serial No. 751,015.

This invention relates to transmission locks and the object of the invention is to provide a lock for locking the transmission gears of an automobile in the neutral position.

Another object of the invention is to provide a lock for the transmission gears of an automobile in which the device can only be locked when the gear shift lever is in the neutral position.

A further object of the invention is to provide a transmission lock in which the lock automatically locks upon cessation of operation of the automobile engine.

A further object of the invention is to provide a transmission lock which when unlocked is held in the unlocked position by the oil pressure of the engine and when the engine stops the cessation of oil pressure allows the lock to automatically lock when the gear shift lever is moved to the neutral position.

These objects and the several novel features of the invention are hereinafter more fully described and claimed and the preferred form of construction by which these objects are attained is shown in the accompanying drawings in which—

Fig. 1 is a section through an automobile transmission mechanism showing my improved lock as incorporated therewith.

Fig. 2 is a section taken on line 2—2 of Fig. 1.

Fig. 3 is a section taken on line 3—3 of Fig. 1 showing the lock in the locked position.

Fig. 4 is a similar section showing the lock in the unlocked position.

As shown in Fig. 1 an opening is provided in the floor boards 1 of the automobile through which the gear shift lever 2 extends. This gear shift lever 2 is provided with a ball 3 on the lower end thereof adapted to engage in the notch 4 in a member 5 or the notch 6 of a member 7 as will be understood from Fig. 2. By means of the gear shift lever the members 5 or 7 may be moved to move the rods 8 and 9 which are attached thereto. These members 5 and 7 are adapted to engage the gears of the transmission so that the gears may thus be shifted by movement of the lever 2 which is the usual practice. The rod 8 is provided with three notches 10, 11 and 12, the notch 11 being deeper than the notches 10 and 12. The rod 9 is provided with three notches 13, 14 and 15, the notch 14 being deeper than the notches 10, 11 and 12 and a spring pressed catch 17 is adapted to engage in the notches 13, 14 and 15, a spring 18 being provided to force the catches 16 and 17 outwardly. When the catches 16 and 17 are engaged in the notches 11 and 14 the gear shift lever is in the neutral position and the spring pressed catches when engaging in the remaining notches are adapted to hold the rods 8 and 9 so that the gears are in reverse, low, second or high speed. The members 16 and 17 are round as shown in Fig. 1 and when engaged in the notches 11 and 14 the catches 16 and 17 are sufficiently far apart as to allow a lock bolt 19 to be slipped therebetween as shown in Fig. 2, which locks the rods 8 and 9 and prevents movement of the gear shift lever to operate the transmission. When the members 16 and 17 are positioned in the shallower notches 10, 12, 13 or 15 the members 16 and 17 are not spaced apart sufficiently to allow the bolt 19 to be inserted therebetween and therefore the device cannot be locked except when the transmission is in the neutral position. As shown in Fig. 1 an aperture 20 is provided through which the bolt 19 is vertically movable to position between the members 16 and 17. The transmission case 21 is provided with a recess 22 in which a steel sleeve 23 is secured by means of the spring pressed pin 24. This spring pressed pin 24 extends into a tapered notch 25 provided in the lock case 26, the notch being so shaped as to limit upward movement of the lock case but to allow downward movement of the lock case, the angular face of the notch forcing the pin outwardly against the tension of the spring 27 shown in Fig. 1. An oil pressure line 28 from the internal combustion engine of the automobile opens into the chamber 29 provided in the lower portion of the steel shell 23 and a double plate 30 is secured to the lower end of the member 23 by means of the screws 31. The locking bolt 19 extends through the double plate 30 and a packing 32 is provided to prevent oil leakage about the lock bolt. A washer 33 is supported on the lock bolt 19 by means of the pin 34 and a coiled spring 35 is provided between the washer and double plate 30 adapted to force the lock bolt downwardly to locking position. A packing 36 is provided at the upper end of the locking bolt 19 and may be compressed by the nut 37 threaded on the locking bolt to closely fit the walls of the cylinder 23. The member 23 is provided with a notch 38 shown in Fig. 3 into which a bolt 39 is movable. This bolt is actuated by rotation of the cylinder lock 40 which is provided with a pin 41 for retracting the bolt against the tension of the spring 42, the bolt being moved from the position shown in Fig. 3 to that shown in Fig. 4 in the unlocking operation. When the lock has been unlocked the spring 43 and plate 44 throw the key 45 into the operator's hand so that there is no possibility of the key being left in the lock. When the device has been unlocked as shown, after the motor has been started, the oil pressure from the engine passes into the chamber 29 through the pipe 28 and raises the lock and case 26 against the tension of the spring 35 thus retracting the lock case and bolt 19 from between the ends of the members 16 and 17 and allows the gear shift lever 2 to be operated. At this time the automobile may be driven in the usual manner as long as the oil pressure is maintained by the engine to hold the lock and case 26 in the raised position. When the engine is stopped the reduction of the oil pressure allows the lock case and locking bolt to be moved downwardly by the tension of the spring 35 and when the gear shift lever has been moved to the neutral position the end of the locking bolt 19 will be forced to position between the members 16 and 17 thus locking the transmission in the neutral position. When unlocked the end of the bolt 39 rides in contact with the inner face of the member 23 caused by the spring 42 and as the lock case moves downwardly the bolt 39 when it comes opposite the notch 38 is forced into the notch by the spring 42 thus locking the lock case in the shell 23 and preventing removal of the locking bolt 19 from between the ends of the members 16 and 17. Due to the angular face 25 shown in Fig. 1 the pin 24 is moved outwardly by downward movement of the lock case 26 so that it rides against the outer face of the casing 26 and extends across the joint between the members 23 and 21 thus preventing removal of the member 23 from the member 21. The pin 24 provides a stop for upward movement of the lock case 26 when it engages in the bottom of the notch 25 in the position shown in Fig. 1 so that the lock case cannot be withdrawn from the member 23. Should the oil pressure from the engine fail the lock will also be operated and will indicate that a new supply of oil is required before further operation of the engine is attempted. With this device the engine is first started to produce an oil pressure at which time the lock is unlocked whereupon the oil pressure will move the casing and locking bolt to the unlocked position and will allow normal operation of the automobile and upon cessation of oil pressure or upon the stopping of the engine the device will be automatically locked as soon as the lever 2 is moved to the neutral position.

From the foregoing description it becomes evident that the device is very simple and efficient in operation, will not easily get out of order, is composed of few parts and is of consequent low manufacturing cost and provides a device which accomplishes the objects described.

Having thus fully described my invention, its utility and mode of operation, what I claim and desire to secure by Letters Patent of the United States is—

A transmission lock comprising the combination with an internal combustion engine having an oil pump, a casing and a gear shifting mechanism enclosed thereby, of a lock device enclosed in a cylindrical casing, the transmission casing being provided with a recess in which the lock device is longitudinally movable, a pipe connecting the oil pump with the recess in the casing, the oil pressure produced by the engine normally maintaining the lock device in the unlocked position in the recess, a spring adapted to move the lock device to locked position upon cessation of the oil pressure, and automatically operated means for locking the lock device from longitudinal movement as it is moved to the locked position.

In testimony whereof I sign this specification.

WALTER M. REASON.